Jan. 27, 1953     O. C. RICHARDSON     2,626,477

FISH LANDING NET

Filed Jan. 10, 1947

Inventor

OLIVER C. RICHARDSON

By McMorrow, Berman & Davidson
Attorneys

UNITED STATES PATENT OFFICE 2,626,477

FISH LANDING NET

Oliver C. Richardson, Detroit, Mich.

Application January 10, 1947, Serial No. 721,187

4 Claims. (Cl. 43—5)

This invention relates to new and useful improvements in fishing tackle and more particularly and specifically to a novel landing net of which the following is a specification.

The primary object of this invention resides in the provision of a new and improved construction for a landing net adapted to be placed about a fishing line and allowed to slide therealong to ensnare a fish hooked upon the line thereby preventing the fight and struggle of the fish while bringing it to gaff.

Another object of this invention resides in the provision of such a fish net of the character described which is extremely desirable and useful when fishing for larger game fish which are known to put up a terrific fight and struggle and which often in the ensuing fight after being hooked escape from the line often damaging the fisherman's tackle and not only disappointing him but causing him undue expense. This landing net as constructed and operated will prevent this fight and make the fish quickly and easily brought aboard.

Still another object of this invention is the provision of such a net as set forth which is of extremely simple and inexpensive design in varied sizes and which is durable and long lasting in use.

Still further improvements in this invention will readily appear to those skilled in the art when the following description is read in the light of the accompanying drawings in which.

Figure 6:
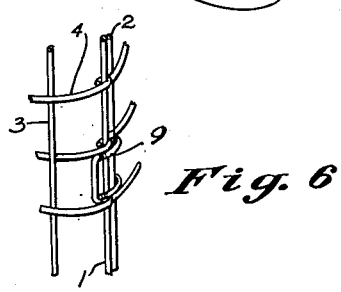
Fig. 6 is a detail view of the section locking means.

Referring now to the accompanying drawings which illustrate the preferred embodiment of this invention and in which like numerals indicate similar parts throughout, A designates the fishing net or cage proper comprising two separate sections 1 and 2 of complementary construction and action, each of said sections comprising a semi-circular elongated wire member having vertical and transverse bars 3 and 4 being joined to form the cage. Each of the sections is hinged vertically adjacent the second section by a plurality of circular hinges 5 vertically spaced along their length between two adjacent edges thereof. The other outer edges are secured together by wire snap fasteners 9 attached to one of the outer edges and adapted to releasably engage the edge of the other outer member as shown in Figure 6.

Figure 1:
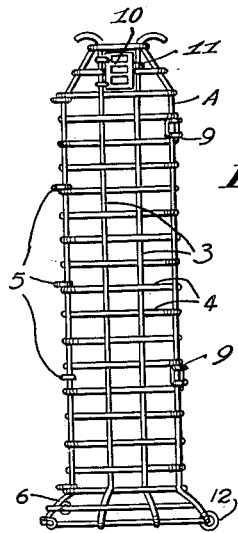
Fig. 1 is a side elevation of the net.
Figure 2:
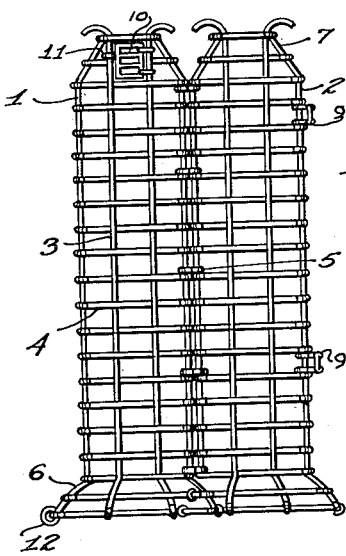
Fig. 2 is a side elevation of the net in its open condition.
Figure 3:
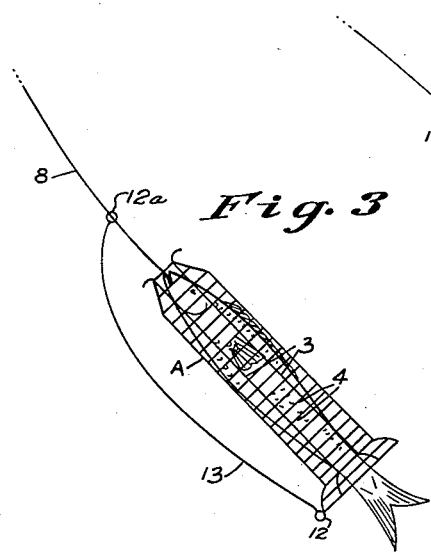
Fig. 3 illustrates this net in use while landing a fish.
Figure 4:
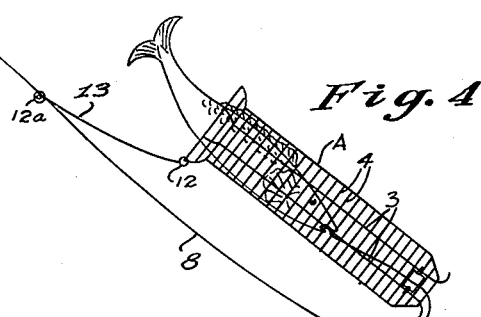
Fig. 4 illustrates the netting of the fish.
Figure 5:
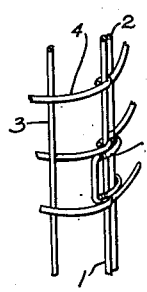
Fig. 5 is a top plan view of the net.

One end of each of the members is outwardly flared as at 6 increasing the diameter of the assembled cage at that end while the second ends of the sections are of an inwardly tapering closure, as at 7, decreasing the diameter of the sections. Both the enlarged and decreased ends of the cage member are open and a fishing line 8 is passed inwardly through the restricted end and outwardly through the enlarged end of the cage where the hook or other like lure and similar tackle are secured in their extended positions therefrom. A small hand hole door 10 is provided in one of the two sections at the upper end thereof between a pair of adjacent vertical bars 3. It is hinged to one of the vertical bars 3 and provided with a snap hook 11 to releasably engage the other vertical bar 3. This door is normally held in a closed position. Thus when a fish is hooked on the lure end of the line the cage like net A in its circular locked position may be allowed to slide downwardly over the fishing line until the restricted end thereof comes into abutment with the nose end of the fish, as illustrated in Fig. 3, thus restricting the movement and agility of the fish within the water and preventing its struggling and fighting and facilitating the consequent landing of the fish. A ring 12 is attached to the lower end of one of the sections and a second line 13 has one end secured thereto, the other end being secured to a ring 12a secured to the adjacent portion of line 8 thus preventing the possible loss of the cage net and facilitating in the landing of the fish by removing excess strain from the single line.

When the fish has been brought to hand the small door 10 may be easily opened to facilitate removal of the hook from the fish's mouth while it is still ensnared within the cage thereby preventing its struggle and possible loss while removing the hook and allowing it to be easily and quickly deposited in a convenient place when it has been removed from the hook by merely inverting the cage and allowing it to slide outward therefrom.

In the event that the fish is extremely large its removal from the cage net is facilitated by the opening of the two sections on their hinges.

Thus it may be seen that a new and improved landing net or cage has been provided which is of extremely simple and inexpensive design and which is quickly operable under any conditions for the desired purposes.

Having thus described and explained this in- vention and with full belief that modifications in size, materials and general characteristics would not constitute a departure from the spirit of this invention, which I desire to claim in Letters Patent is:

1. A fish landing net comprising an elongated tubular cage formed of two rigid semi-cylindrical open mesh members, said members being hinged together along one pair of adjacent longitudinal edges, and means for releasably securing together the other pair of adjacent longitudinal edges, said cage having a restricted opening at one end and a flared opening at the other end.

2. A fish landing net comprising an elongated tubular cage formed of two rigid semi-cylindrical open mesh members, said members being hinged together along one pair of adjacent longitudinal edges, means for releasably securing together the other pair of adjacent longitudinal edges, said cage having a restricted opening at one end and a flared opening at the other end, one end of said members having a hand hole therethrough near the restricted opening, a door hingedly mounted in said hole, and means for releasably securing said door in a closed position.

3. A fish landing net comprising an elongated tubular cage adapted to be slidably disposed on a fishing line formed of two rigid semi-cylindrical open mesh members, rings hingedly connecting the members together along one pair of adjacent longitudinal marginal edges, and means for releasably securing together the other pair of adjacent longitudinal marginal edges, said cage having a restricted opening at one end and having an annular collar on the other end, said collar projecting forwardly and laterally of the cage to form a flared opening.

4. A fish landing net comprising an elongated tubular cage adapted to be slidably disposed on a fishing line formed of two rigid semi-cylindrical open mesh members, rings hingedly connecting the members together along one pair of adjacent longitudinal marginal edges, means for releasably securing together the other pair of adjacent longitudinal marginal edges, said cage having a restricted opening at one end and having an annular collar on the other end, said collar projecting forwardly and laterally of the cage to form a flared opening, and a pull line connected to the collar, said collar providing an entrance for a hooked fish as the cage is lowered on the line and the cage then being inverted by the pull line to trap the fish therein.

OLIVER C. RICHARDSON.

REFERENCES CITED

The following references are of record in the file of this patent:

UNITED STATES PATENTS

| Number | Name | Date |
| --- | --- | --- |
| 13,539 | Butterfield | Sept. 11, 1855 |
| 422,226 | Kestner | Feb. 25, 1890 |
| 785,451 | Tourville | Mar. 21, 1905 |
| 964,060 | Schroer | July 12, 1910 |
| 1,007,477 | Moscrip | Oct. 31, 1911 |
| 1,022,740 | Hubbell | Apr. 9, 1912 |
| 1,132,428 | Boswell | Mar. 16, 1915 |
| 1,185,798 | Hofer | June 6, 1916 |
| 1,244,954 | Burk | Oct. 30, 1917 |
| 1,797,251 | Tyrell | Mar. 24, 1931 |
| 2,252,073 | Gray | Aug. 12, 1941 |

FOREIGN PATENTS

| Number | Country | Date |
| --- | --- | --- |
| 60,401 | Norway | Jan. 30, 1939 |